United States Patent [19]

Murai

[11] Patent Number: 4,691,640
[45] Date of Patent: Sep. 8, 1987

[54] AUTOMOTIVE BODY, FLOOR CONVEYOR, HAVING PIVOTAL CARRIERS

[75] Inventor: Masasumi Murai, Saitama, Japan
[73] Assignee: Tsubakimoto Chain Co., Osaka, Japan
[21] Appl. No.: 789,306
[22] PCT Filed: Dec. 27, 1984
[86] PCT No.: PCT/JP84/00627
  § 371 Date: Oct. 7, 1985
  § 102(e) Date: Oct. 7, 1985
[87] PCT Pub. No.: WO86/04029
  PCT Pub. Date: Jul. 17, 1986
[51] Int. Cl.⁴ ............................................. B61B 10/00
[52] U.S. Cl. .................................... 104/140; 104/140; 104/172.3; 118/324
[58] Field of Search ........... 104/139, 140, 170, 172 B, 104/172 R, 172 S, 172.1, 172.2, 172.3; 118/324, 326, 635; 198/860.3

[56] References Cited

U.S. PATENT DOCUMENTS

| | | | |
|---|---|---|---|
| 536,357 | 3/1895 | DePalacio | 104/139 X |
| 3,066,616 | 3/1961 | Weisberg | 104/172 B |
| 3,434,706 | 3/1969 | Roder | 104/140 X |
| 3,808,978 | 5/1974 | Ward | 104/140 X |
| 3,859,925 | 1/1975 | Hartz | 104/139 X |
| 4,408,540 | 10/1983 | Dehne | 104/172 B |
| 4,464,998 | 8/1984 | Wakabayashi | 104/172 S X |
| 4,501,353 | 2/1985 | Burkhardt | 198/860.3 |
| 4,542,698 | 9/1985 | Wakabayashi | 104/172 B |

FOREIGN PATENT DOCUMENTS

| | | | |
|---|---|---|---|
| 0684284 | 4/1964 | Canada | 118/326 |
| 55-40145 | 3/1980 | Japan . | |
| 58-218465 | 12/1983 | Japan . | |
| 59-42754 | 3/1984 | Japan . | |
| 59-72164 | 5/1984 | Japan . | |
| 0846426 | 7/1981 | U.S.S.R. | 104/172 S |
| 0921993 | 4/1982 | U.S.S.R. | 104/172 S |

Primary Examiner—Robert B. Reeves
Assistant Examiner—Scott H. Werny
Attorney, Agent, or Firm—Dann, Dorfman, Herrell and Skillman

[57] ABSTRACT

A floor conveyor eliminates inclination and rolling of a vehicular body during conveying. A pair of channel members having a substantially rectangular recess on one side are oppositely arranged just under a working floor with sufficiently large spacing defined therebetween to form a carrier track, and cylindrical travelling rollers arranged at front and rear portions of a carrier are inserted into the recess of the rails. Vertical shaft guide rollers are rotatably supported on the travelling roller shafts of the carrier. At a substantially central position just above the roller shafts the rollers have a width smaller than a spacing between the rails. The support legs are inserted through the guide channels, and comprise a C-shaped structure where a part of the support legs on the floor surface is recessed sidewardly with respect to a conveying direction.

9 Claims, 11 Drawing Figures

AUTOMOTIVE BODY, FLOOR CONVEYOR, HAVING PIVOTAL CARRIERS

FIELD OF THE INVENTION

The present invention relates to conveyors for use in automotive assembly plants in which the track for the conveyor is mounted underneath the floor.

The present invention relates to a floor conveyor which is operable to continuously convey automotive bodies on a conveyor line in an automobile assembly plant which carries out various operations, such as working, assemblying and painting, etc. In particular, the present invention provides a conveyor which stably supports the automotive bodies so as to limit swaying of the bodies as they are conveyed and worked upon. The invention also provides apparatus which prevents essential parts of the conveyor in a painting booth from being stained by sprayed paint or other coating material.

BACKGROUND OF THE INVENTION

Floor conveyors for use in automotive assembly plants are disclosed in Japanese Patent Publication No. 40145/1980 and U.S. Pat. No. 4,408,540. Such structures are not satisfactory for use in assembly plants.

In Japanese Patent Publication No. 40145/1980, the conveyor is mounted in a housing which is laid on top of the floor surface in the assembly plant which therefore provides a barrier to the movement of other objects across the conveyor line. The top opening of the housing is covered by a rubber or other elastic material for preventing entry of coating material into the housing. However, if an operator must cross over the conveyor, he cannot step on the rubber cover and it is also dangerous to straddle the housing. Such arrangement therefore restricts the ability of the operators to pass from one side to the other of the conveyor and thereby causes a reduction in work efficiency.

Even though the top opening of the housing is covered by the elastic material, when the conveyor operates to move the automobile body past the painting operation, the support leg for the automotive body must pass through the cover material which creates a spacing adjacent the support which may permit coating material to enter within the housing.

The automobile body is mounted on a carrier which travels along the rail, and to limit swaying of the body the carrier is provided with front, rear, right and left (i.e, four) guide rollers. On straight sections this is no problem, but going around curves or up slopes there must be sufficient clearance to permit the turning movement and it is possible that the rollers will derail.

The conveyor shown in U.S. Pat. No. 4,408,540 eliminates the enlarged upper opening which is characteristic of the Japanese patent and provides a narrow opening between closely-spaced rails. If the conveyor mounts an object such as a vehicular body having a large width (normally 1.5–2.0 meters) or another object whose center of gravity may be offset to one side owing to the presence of the steering wheel or the like, it is possible that the center of gravity of the body fails outside of the path of the carriers, and the carrier tends to tilt, even though guide rollers may be positioned between the traveling rollers. Even if the center of gravity of the body is normally directly over the rail, it is subject to swaying by reason of any small force which may occur in the normal handling operations involved in working on the automotive body. Swaying movement of the body on the conveyor is particularly serious when operations are being performed on both sides of the body at the same time. For this reason, the conveyor shown in the U.S. patent has not proved satisfactory.

The effect of swaying of the vehicular body will be described more concretely with reference to FIG. 11 of the attached drawings. In this figure, the automotive body M is shown supported on a stand mounted on a carrier between rails R. In the full-line position, the center of gravity of the body is directly over the center line of the rails. When a force f is applied to the right side of the body M, it sways to the position shown in broken lines in the figure.

If the height from a horizontally central surface H of the rails R to a point where the manual pushing force (f) is applied to a vehicular body M is L, a moment of inclination in a manual operation is fL. If the weight of the vehicular body is W, and an outside spacing between carrier rollers is ($s_1$), a moment of stability resisting the moment of inclination is $\frac{1}{2}(Ws_1)$. Therefore, when the moment of inclination fL is $FL > \frac{1}{2} (Ws_1)$, the vehicular body W is inclined by the manual pushing force. For example, if the height L, outside spacing ($s_1$) and load W of the vehicular body are L=1,500 mm, ($s_1$)=100 mm, and W=200 kg, respectively, the manual pushing force (f) is (f)>6.7 kg. This magnitude of the force (f) does not allow the traveling rollers to be moved laterally relative to the rail R, and it will be appreciated that the vehicular body may be easily inclined or swayed by the manual pushing force. In the event that the center of gravity of the vehicular body is deflected, the vehicular body may be inclined even by further smaller force (f). Further, if a vertical spacing (d) between an inner surface of the rail R and the traveling rollers is d=3 mm, an amount of inclination during swaying of the vehicular body at the manually pushing point is 3×1,500/100=4.5 mm.

In other words, the vehicular body is likely to be inclined by its deflection of the center of gravity or an external force, and is inclined by a centrifugal force at curvature. For these reasons, there occur many problems which create a bad influence on the life of the rail, difficulty in manual operation, and reduction in quality, e.g. in painting, the painted surface is waved because of the swaying of the vehicular body upon passing through a connection of the rail. Consequently, this prior art conveyor is not satisfactory.

SUMMARY OF THE INVENTION

Accordingly, it is an object of the present invention to provide a floor conveyor which may limit inclination and swaying of a vehicular body during conveying.

It is another object of the present invention to provide a floor conveyor which includes a narrow guide slot in the working floor constituting a passage for a support leg for supporting the vehicular body on the conveyor, and permits safe travel on the working floor and traveling of a vehicle or the like across a conveyor line.

It is further object of the present invention to provide a floor conveyor which may prevent foreign matter and sprayed paint or other coating material from entering and adhering to an essential part of the conveyor under the floor through the guide slot in the working floor.

According to the present invention, a pair of steel rails, such as channel members having a substantially rectangular channel recess on one side, are oppositely arranged just under a working floor with sufficiently large spacing therebetween to form a carrier track. Cylindrical traveling rollers arranged at front and rear portions of a carrier are inserted into the channels of the rails, so as to reduce lateral inclination of the carrier due to swaying of a vehicular body as it is conveyed. Further, vertical-axis guide rollers are rotatably supported adjacent to the traveling rollers of the carrier at substantially central position just above the traveling rollers, and are inserted into a guide slot having a width smaller than a spacing between the channels. The slot is formed by the inner edges of right and left guide plates fixed on the channel members, so as to limit lateral movement of the carrier during traveling and maintain the rollers within the channels, also reducing lateral inclination of the carrier.

The guide plates cover a wide opening at the top of a receiving space under the working floor which houses the carrier track having a relatively large spacing between opposed channel members, and the essential parts of a conveyor such as the carrier and a carrier drive chain, leaving only the narrow guide slot uncovered. Accordingly, the essential parts of the conveyor are protected from adhesion of dust and particles of coating material entering from above the working floor, and the life of the conveyor is prolonged. Furthermore, safe passage over the working floor may be secured and work efficiency in the assembly plant may be improved. Additionally, vehicles are permitted to travel over the working floor.

A stand mounting thereon an object to be conveyed is connected for pivotal movement on horizontal axes at front and rear portions thereof to the upper ends of support legs which are respectively pivotally supported in the central portion of two carriers so as to be forwardly and rearwardly inclined, and thereby to be moved over the floor surface. The support legs are inserted through the guide slots, and in the present instance, each leg has a C-shaped bent portion above the floor surface which is recessed sidewardly with respect to a conveying direction. In the case that a vehicular body as a conveyed object is spray-coated in a painting booth, there is provided in the painting booth a tunnel-like shielding cover overlying the guide slot so as to provide a passage for part of the C-shaped bent portion as above mentioned, so as to prevent foreign matter from entering and adhering to the essential parts of the conveyor under the floor through the guide slot.

Other features of the present invention will be apparent from the following detailed description of the preferred embodiments in connection with the accompanying drawings.

BRIEF DESCRIPTION OF THE DRAWINGS

The drawings show preferred embodiments of the present invention, in which.

DESCRIPTION OF THE PREFERRED EMBODIMENTS

Figure 1:
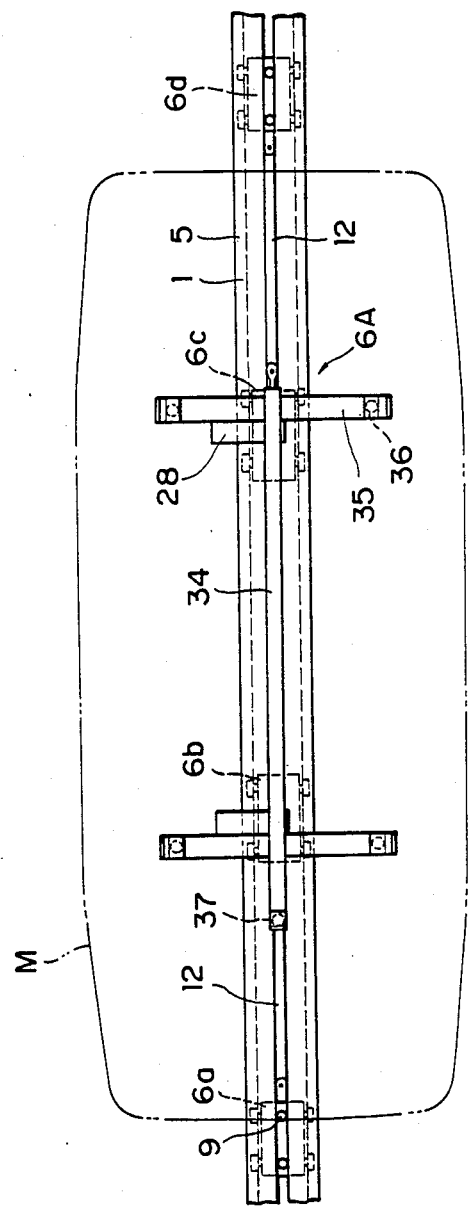
FIG. 1 is a plan view of a conveyor embodying the present invention apart from the floor surface, showing in broken lines an automotive body carried by the conveyor.
Figure 2:
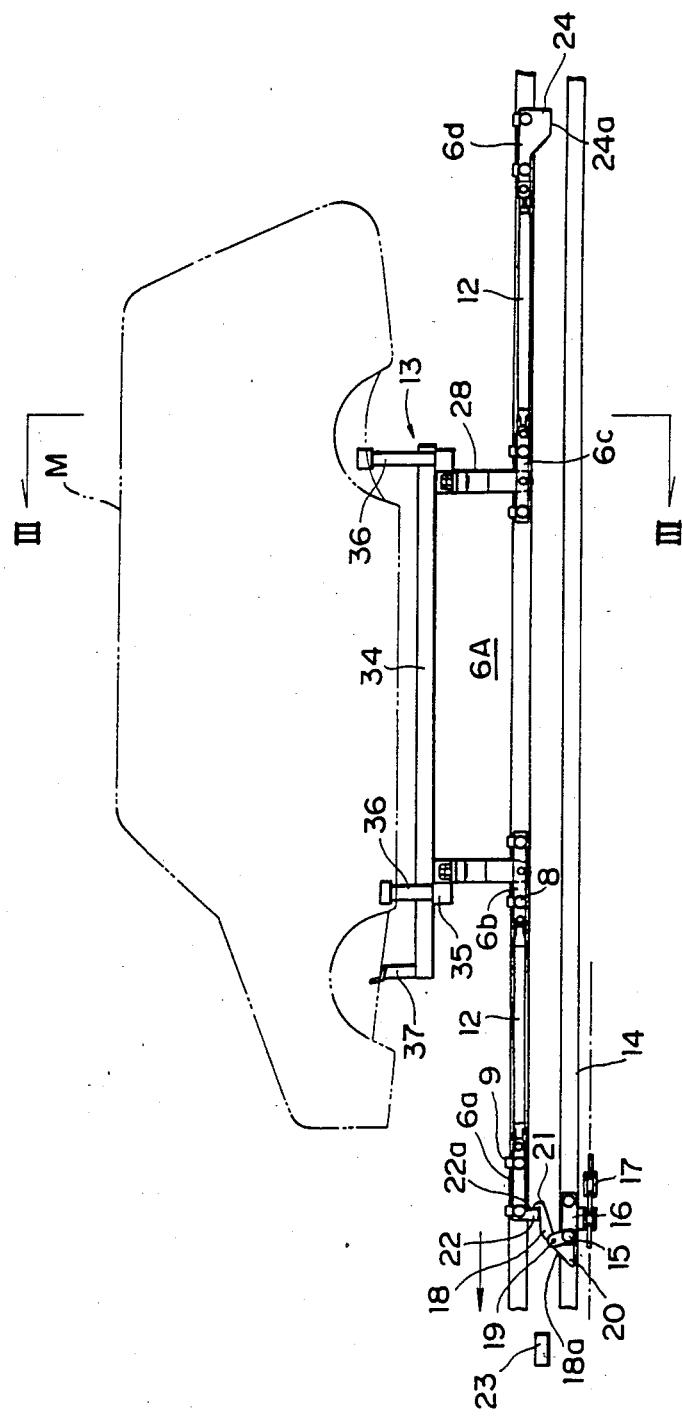
FIG. 2 is an elevational view of FIG. 1.
Figure 3:
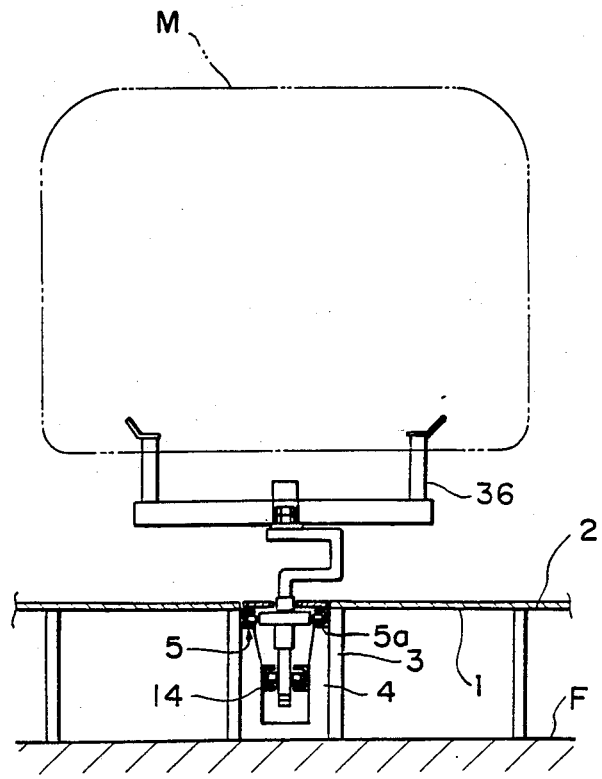
FIG. 3 is a cross section taken along the line III—III in FIG. 2 showing its position relative to a floor surface.

In FIGS. 1 to 3, a floor conveyor of the present invention is arranged along a conveyor feeding line between a shop floor F (FIG. 3) and a working floor 1 laid on a level higher than the floor F. A floor board 2 is laid on the working floor 1. Struts 3 and U-shaped support plates 4 are longitudinally arranged at given intervals and are fixed to both sides of the floor conveyor by a suitable means such as welding, to level the upper ends of the struts 3 and to secure them to the lower surface of the floor board 2. Channel member rails 5a of steel having oppositely-facing C-shaped cross sections are in contact with the inner surfaces of the upper ends of the struts 3 and the upper ends of the supporting plates 4 which are lower in height than the inner surface and are fixed such that the upper surfaces of the channel member rails 5a are level with the upper ends of the struts 3 to form a carrier track 5.

Figure 4:
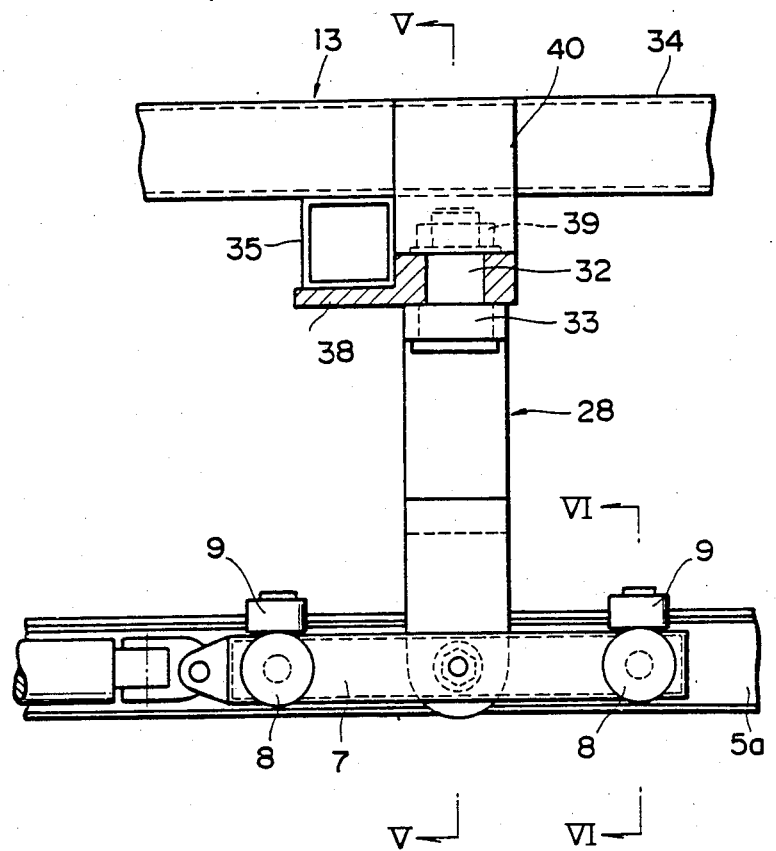
FIG. 4 is an enlarged fragmentary vertical sectional view showing a stand, supporting leg, and a carrier.
Figure 6:
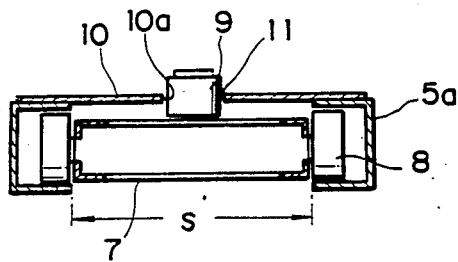
FIG. 6 is a cross section taken along the line VI—VI in FIG. 4.

Four carriers 6 (6a, 6b, 6c and 6d) are substantially the same and are interconnected to form a traveling structure. As shown in FIGS. 4 and 6, traveling rollers 8 are rotatably supported on axles mounted at front and rear portions of a hollow box-like carrier frame 7, to travel in the inside channels of the channel members 5a. The rollers 8 ride on the lower flange and a small clearance spacing is provided between the rollers 8 and the upper flange. As shown in FIG. 6, guide rollers 9 are rotatably supported on vertical axes and are disposed in a laterally central position at the front and rear portions of the frame 7, and are positioned in a guide slot 11 formed by inside edges 10a of a pair of guide plates 10 fixed to the upper surface of the channel members 5a, thereby permitting the carriers 6a to 6d to be guided as they travel along the center of the track 5, preventing sideward deflection of the traveling rollers 8 and derailing of the carriers at curved points where rail spacing is enlarged and at switches or junctions.

The carriers 6a and 6b and the carriers 6c and 6d are connected with each other by respective connecting rods 12 through universal joints mounted on both ends of the connecting rods 12, and the carriers 6b and 6c are connected with each other by a vehicle mounting stand 13 to construct a traveling structure 6A (FIG. 1).

A track 14 consisting of a pair of channel member rails is fitted in the U-shaped recess of the support plate 4 under the carrier track 5 to construct a chain trolley track 14, and endless driving chains 17 are connected at equal intervals to a plurality of trolleys 16 traveled by rollers 15 on the rails, thereby moving the trolleys 16 in a direction as depicted by the arrow in FIG. 2.

Hooks 18 are vertically pivotably supported by pins 19 on the trolleys 16 at intervals corresponding to substantially entire length of the carrier connector 6A. The hooks 18 are provided at their front portions with weights 20 projecting forwardly from the trolleys 16 and are normally biased such that engagement pawls 21 formed at the rear portions of the hooks 18 are raised to an upper engaging position. A downwardly-projecting engagement piece 22 is fixed to the frame 7 of the leading carrier 6a, and the pawl 21 is engaged with a rear slant surface 22a of the engagement piece 22 so as to convey the traveling structure 6A in the direction of the arrow in FIG. 2. When a front slant surface 18a of the hook 18 abuts against a stopper 23 provided in the conveying lane, the hook 18 is rotated to disengage the pawl 21 from the engagement piece 22, thereby stopping the traveling structure 6A.

An engagement release piece 24 having a bottom surface 24a leveled to the stopper 23 is fixed to the frame 7 of the fourth and last carrier 6d. When the hook 18 of a trailing traveling structure 6A approaches a leading traveling structure 6A at rest (not shown), the front slant surface 18a of the hook 18 drawing the trailing structure 6A collides with the engagement release piece 24 of the leading structure 6A at rest, the hook 18 is disengaged from the engagement piece 22 to stop the trailing structure 6A. Accordingly, the leading and trailing structrures 6A may be stored on a conveyor line, being in contact with each other, and when the stopper 23 is sidewardly retracted, the engagement piece 22 is engaged with a subsequent hook 18 to start the leading traveling structure 6A.

Figure 5:
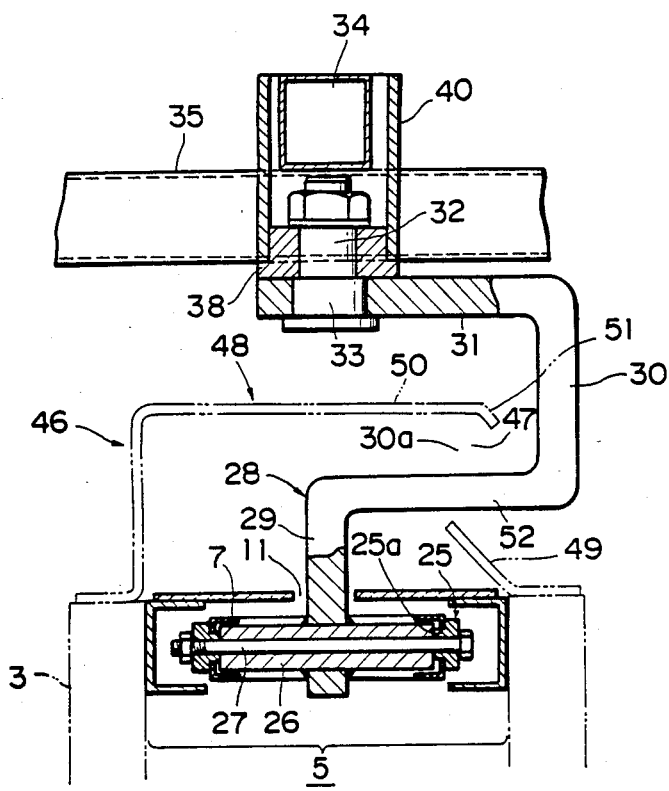
FIG. 5 is a cross section taken along the line V—V in FIG. 4 showing in broken lines floor struts and shielding cover means for the guide slot.

FIGS. 4 and 5 show a connection from the carriers 6b and 6c to the stand 13. The hollow box-like carrier frame 7 has a width substantially equal to a rail spacing (s) of the carrier track 5. Small diameter portions 25a of thrust metal bearings 25 are inserted into holes formed on both sides of the frame 7 at a central portion between the front and rear traveling rollers, and an axle 26, which is in contact with the inside ends of the small diameter bearings at both ends thereof, and the right and left thrust metal bearings 25 are fastened by a common bolt 27 as inserted through both the axle and the thrust metal bearings, thereby fixing the thrust metal bearings 25 to the frame 7 and pivotally supporting the axle 26. A lower vertical portion 29 of a C-shaped support leg 28 is welded to the axle 26 at its central portion. The C-shaped support leg 28 has a lower horizontal bent portion 52 mounting a vertical bent portion 30 offset to one side of the rail 5, and pin 32 which is axial alignment with the lower vertical portion 29 is fixed at its base portion 33 to an upper horizontal portion 31.

The stand 13 mounting an automotive body M thereon is constructed of a longitudinal member 34 formed of a square box beam, horizontal members 35 formed of similar box beams and fixed at right angles to front and rear lower surface of the longitudinal member, upright struts 36 fixed to both ends of the horizontal members 35, and a strut 37 fixed to a front end of the longitudinal member 34. The pins 32 are inserted through holes of metal fittings 38 (FIGS. 4 and 5) fixed to central lower surfaces of the horizontal members 35, so as to support the stand 13 on the support leg 28, and the horizontal members 35 are horizontally rotatably fixed by nuts 39. Perpendicular members 40 are fixed to the metal fittings 38 and the vertical members 34 to further strongly assemble both members 38 and 34 into a unitary assembly.

The rail spacing (s) is set to a sufficiently large value such that even when the center of gravity of the vehicular body M mounted on the stand 13 is sidewardly offset because of difference in a vehicular structure such as a position of a steering wheel and a fuel tank, it is always within the spacing (s), thus allowing the right and left traveling rollers 8 to be stably supported on the rail channel member 5a. However, since the floor opening portion above the spacing (s) is covered with a guide plate 10 except for a guide slot 11 of a small width (less than about 50 mm) which prevents a foot or a wheel from entering it, there is no danger from traveling on the working floor, and a truck, etc. is permitted to safely cross the guide slot 11.

With this arrangement, as the axle 26 is arranged at the central portion of the carriers 6b and 6c, acceleration of the shaft tube 26 is suppressed relative to lateral acceleration received by the traveling rollers 8 at curved or switched positions of the track 5, and the shaft tube 26 constitutes a pivot having a sufficient length nearly equal to an entire width of the carrier, thus restricting the swaying motion of the vehicular body M to be sufficiently small, as limited by the clearance between the rollers 8 and the underside of the top flange of the channel members 5a.

Figure 7:
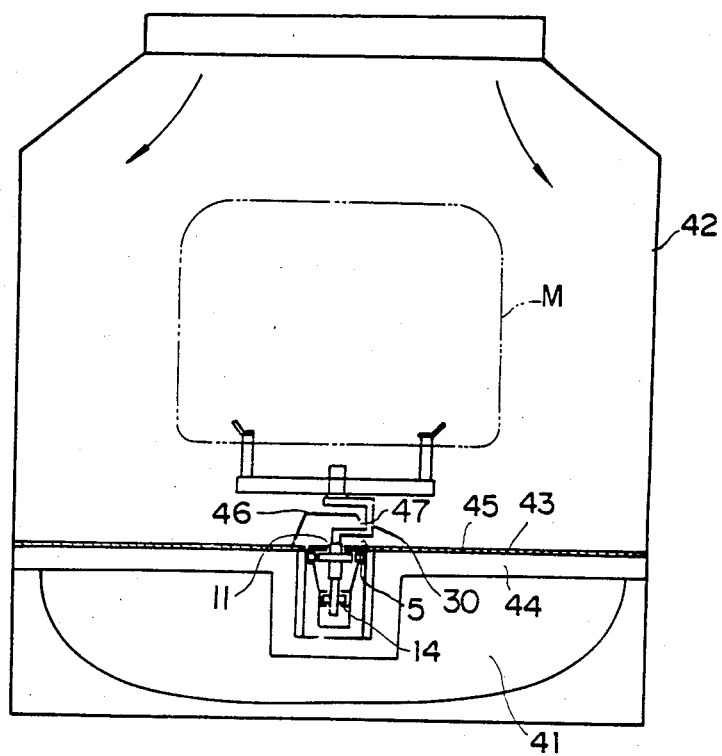
FIG. 7 is a schematic horizontal sectional view of a painting booth in which a conveyor of the present invention is installed.
Figure 11:
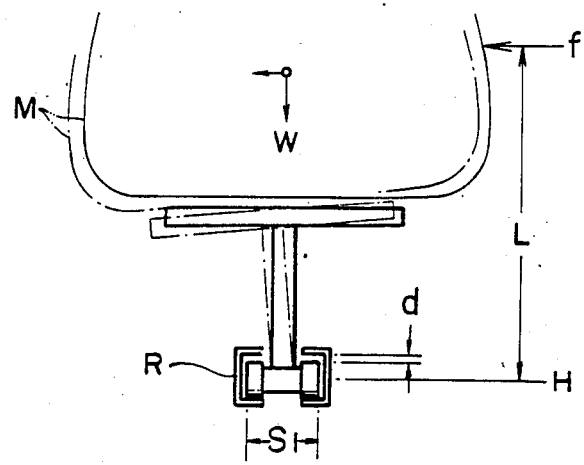
FIG. 11 is a view of a prior art structure showing a condition where swaying is generated in a floor conveyor.

FIG. 7 shows an example of a painting booth for the vehicular body M. Tracks 5 and 14 are introduced to a position just under a floor 43 in a painting booth 42 including a paint-flushing space 41 under the floor, and a grating 45 (instead of the floor board 2) is laid on floor beams 44 provided over the flushing space 41 to the substantially same level as the track 5. There is provided a tunnel-like shielding cover 46 (see FIG. 5) covering the guide channel 11 over the entire length of the painting booth, and a passage 47 of small width through which the lower substantially horizontal portion 52 of the C-shaped support leg 28 passes is opened to one side of the shielding cover 46.

As shown in broken lines in FIG. 5, the shielding cover 46 consists of shielding plates 48 and 49 bolted to both side struts 3 at the bases thereof. The shielding plate 48 has an upper plate portion 50 which enters into a recess 30a of the C-shaped support leg 28 and a lip 51 of small width downwardly bent at its tip end. The shielding plate 49 is bent upwardly slantwise toward the lower vertical portion 29 beneath the lower horizontal portion 52 of the C-shaped support leg 28, and a tip end of the shielding plate 49 is spaced from the lip 51 to form the passage 47 allowing the lower horizontal portion 52 to pass therethrough between the plate 49 and the lip 51. As the passage 47 opens downwardly slantwise, there is no possibility that ventilating air discharged downwardly from a ceiling of the booth 42 through the grating 45 will suck sprayed coating material, such as paint, into the passage 47, thereby keeping the interior of the shielding cover 46 clean.

Figure 8:
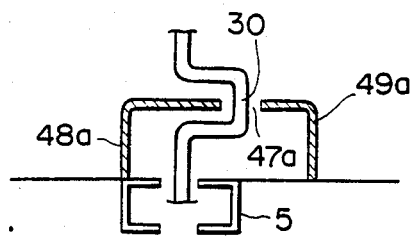
FIGS. 8, 9 and 10 are fragmentary diagrammatic horizontal sectional views of various modifications of a shielding cover.
Figure 9:
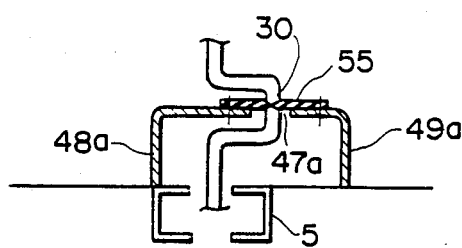

FIGS. 8 and 9 show other embodiments of the shielding cover. In FIG. 8, a passage 47a for the vertical bent portion 30 is formed by using shielding plates 48a and 49a. In FIG. 9, elastic members 55 such as rubber is mounted on the shielding plates 48a and 49a so as to close the passage 47a by engaging around the vertical portion 30.

Figure 10:
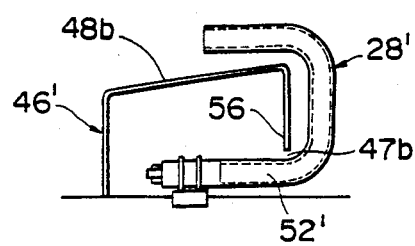

In FIG. 10 showing a further embodiment, the lower horizontal portion 52' of the C-shaped support leg 28' is arranged near the floor surface, and the shielding cover 46' is formed of a single shielding plate 48b fixed to the strut 3 on one side. A passage 47b for the lower horizontal portion 52' is formed between an end vertical portion 56 and the floor surface. An upper surface of the shielding plate 48b is inclined downwardly toward the one side, so as to prevent a coating material sprayed on the upper surface from flowing down to the side where the passage 47b is located.

While selected embodiments of the invention have been illustrated and described, the invention is defined by the appended claims.

I claim:

1. In a floor conveyor for conveying an automotive body on a track provided just under the working floor surface, including a stand for mounting the automotive body with its center of gravity directly overlying said track, support legs for supporting the stand at front and rear portions of the stand above the working floor surface, each leg having a carrier comprising traveling rollers with horizontal axes at its front and rear portions adapted to travel on said track, the improvement wherein:

the track comprises a pair of laterally-spaced channel members having their channels facing one another to receive the traveling rollers therein, the vertical height of said channels affording limited vertical displacement of said rollers in the respective channels when the automotive body sways from side to side, the spacing of said channels being greater than the sideward fluctuation of said center of gravity when said body sways;

said support legs being mounted at their lower ends on said carriers by axles positioned between said front and rear traveling rollers parallel to their rotational axes and having a length substantially the same as the spacing of said channels, said axles permitting said legs to pivot forwardly and rearwardly on said carriers but not laterally;

each carrier including vertical-axis guide rollers at the front and rear thereof;

said channel members having guide plates oppositely arranged on upper surfaces thereof providing therebetween a guide slot receiving the guide rollers and having a width smaller than the spacing of said channels and slightly greater than the diameter of said guide rollers so as to guide the carriers to maintain the traveling rollers within the channels of said channel members.

2. The floor conveyor of claim 1 wherein each of said carriers comprises a hollow box-like frame, the axle associated with said carrier being journalled for pivotal movement in said carrier frame at its opposite ends, said support leg projecting upwardly from said axle through said guide slot.

3. The floor conveyor of claim 1 wherein said support legs are pivotally connected at their upper ends to said stand for mounting said automotive body on said legs for pivotal movement about axes perpendicular to the axles mounting the lower ends of said legs on said carriers.

4. The floor conveyor of claim 1 wherein said support legs have a bent portion adapted to accommodate a cover element supported on said floor surface at one side of said guide slot and overlying said slot.

5. A painting booth with a floor conveyor for conveying an automotive body over a working floor surface, a track provided just under the floor surface, a stand for mounting the automotive body with its center of gravity directly overlying said track, support legs at front and rear portions of the stand for supporting the stand above the working floor surface, each leg having a carrier comprising traveling rollers with horizontal axes at its front and rear portions adapted to travel on said track, said track comprising a pair of laterally-spaced channel members having their channels facing one another to receive the traveling rollers therein, the vertical height of said channels affording limited vertical displacement of said rollers in the respective channels when the automotive body sways from side to side, the spacing of said channels being greater than the sideward fluctuation of said center of gravity when said body sways, said support legs being mounted at their lower ends on said carriers by axles positioned between said front and rear traveling rollers parallel to their rotational axes and having a length substantially the same as the spacing of said channels, said axles permitting said legs to pivot forwardly and rearwardly on said carriers but not laterally, each carrier including vertical-axis guide rollers at the front and rear thereof, said channel members having guide plates oppositely arranged on upper surfaces thereof providing therebetween a guide slot receiving the guide rollers and having a width smaller than the spacing of said channels and slightly greater than the diameter of said guide rollers so as to guide the carriers to maintain the traveling rollers within the channels of said channel members.

6. The painting booth of claim 5 wherein each of carriers comprises a hollow box-like frame, the axle associated with said carrier being journalled for pivotal movement in said carrier frame at its opposite ends, said support leg projecting upwardly from said axle through said guide slot.

7. The paint booth of claim 5 wherein said support legs are pivotally connected at their upper ends to said stand for mounting said automotive body on said legs for pivotal movement about axes perpendicular to the axles mounting said legs on said carriers.

8. The painting booth of claim 5 including a shielding cover element supported on said floor surface at one side of said guide slot and overlying said slot, said support legs having a bent portion adapted to accommodate said shielding cover element.

9. The painting booth of claim 8 wherein said shielding cover is positioned above said guide slot to provide a narrow passage between one of said guide plates and the free marginal portion of said cover, said bent portion having a substantially horizontal part adapted to travel above said guide plate within said narrow passage.

* * * * *